US008392641B2

(12) United States Patent
Shrivastava et al.

(10) Patent No.: US 8,392,641 B2
(45) Date of Patent: Mar. 5, 2013

(54) MICROCONTROLLER WITH AN INTERRUPT STRUCTURE HAVING PROGRAMMABLE PRIORITY LEVELS WITH EACH PRIORITY LEVEL ASSOCIATED WITH A DIFFERENT REGISTER SET

(75) Inventors: Pankaj Shrivastava, San Jose, CA (US); Gregory Goodhue, San Jose, CA (US); Ata Khan, Saratoga, CA (US); Zhimin Ding, Sunnyvale, CA (US); Craig MacKenna, Los Gatos, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 12/785,943

(22) Filed: May 24, 2010

(65) Prior Publication Data

US 2010/0299471 A1 Nov. 25, 2010

Related U.S. Application Data

(63) Continuation of application No. 10/566,515, filed as application No. PCT/IB2004/051332 on Jul. 29, 2004, now abandoned.

(60) Provisional application No. 60/490,951, filed on Jul. 30, 2003.

(51) Int. Cl.
    *G06F 13/24* (2006.01)
(52) U.S. Cl. ........................................ 710/260; 712/228
(58) Field of Classification Search .......... 710/260–262; 712/228–229; 711/5
    See application file for complete search history.

(56) References Cited

U.S. PATENT DOCUMENTS

| 5,155,853 | A |   | 10/1992 | Mitsuhira |
|---|---|---|---|---|
| 5,260,897 | A | * | 11/1993 | Toriumi et al. ............... 708/524 |
| 5,270,898 | A | * | 12/1993 | Elms et al. ...................... 361/96 |
| 5,276,892 | A | * | 1/1994 | Olesin et al. .................. 712/245 |
| 5,426,766 | A |   | 6/1995 | Ogata |
| 5,450,566 | A | * | 9/1995 | Yoshida et al. ............... 711/150 |
| 5,751,988 | A | * | 5/1998 | Fujimura .......................... 711/5 |
| 5,913,924 | A |   | 6/1999 | Zhou et al. |
| 6,029,241 | A |   | 2/2000 | Wojewoda et al. |
| 6,035,422 | A | * | 3/2000 | Hohl et al. ....................... 714/35 |
| 6,154,803 | A | * | 11/2000 | Pontius et al. ................ 710/310 |
| 6,795,911 | B1 |   | 9/2004 | Miyano |

FOREIGN PATENT DOCUMENTS

| EP | 0 441 054 A1 | 8/1991 |
|---|---|---|
| EP | 1124185 A1 | 8/2001 |
| JP | 09054697 A | 2/1997 |
| WO | 96/08948 | 3/1996 |
| WO | 00/79389 A1 | 12/2000 |

OTHER PUBLICATIONS

"Register Banking for IBM System/370" IBM Technical Disclosure Bulletin, vol. 34, No. 4B, Sep. 1991.

* cited by examiner

*Primary Examiner* — Clifford Knoll (57) ABSTRACT

Aspects of the disclosure are directed to a system having a particularly-configured microcontroller. In one embodiment, the microcontroller includes the following: a processor; a processor data bus connected to the processor; a set of peripherals; a peripheral data bus connected to the peripherals; a peripheral bus bridge providing an interface between the processor data bus and the peripheral data base and including a plurality of special function register bank blocks that are internal to the microcontroller, each register bank block having a respective output; and a register bank block decoder circuit for decoding interrupts to provide a selection output for activation of one of the plurality of register bank blocks.

24 Claims, 8 Drawing Sheets

MICROCONTROLLER WITH AN INTERRUPT STRUCTURE HAVING PROGRAMMABLE PRIORITY LEVELS WITH EACH PRIORITY LEVEL ASSOCIATED WITH A DIFFERENT REGISTER SET

RELATED PATENT DOCUMENTS

This patent document is a continuation under 35 U.S.C. § 120 of U.S. patent application Ser. No. 10/566,515 filed on Jan. 30, 2006 now abandoned, which is a 35 U.S.C. § 371 national stage entry of International Application No. PCT/IB2004/51332 filed on Jul. 29, 2004 which claims priority benefit under 35 U.S.C. § 119 of U.S. application No. 60/490,951 filed on Jul. 30, 2003 to which priority is also claimed here.

The invention relates to the field of processor architecture and more specifically to the field of data register architecture for use with microcontrollers.

Program stream data is typically stored in a memory circuit, where the instructions encoded within the program data for a particular routine are executed by a processor, when an interrupt occurs, one program stream interrupts the execution of another one. The multiple instructions making up each program stream are stored at a specific location in the memory circuit. The program stream instructions allow the processor to carry out various tasks. Instructions from each program stream are typically sequentially retrieved and processed one at a time.

While processing instructions from a program stream, the processor utilizes program registers. These registers are memory locations within the processor that support very high speed direct access by the microprocessor. For example, some operations are specifically for processing data directly within the registers. Program stream data read from the memory circuit is stored in these registers and the processor performs logical and arithmetic operations on the values stored therein. When the execution of a first program stream becomes interrupted by a second other program stream, the contents of the program registers corresponding to the first program stream are typically stored elsewhere in order to allow the interrupting program to utilize the same set of program registers. Once the interrupting program—second program stream—has completed its sequence of instructions, the contents of the program registers corresponding to the first program stream are restored and execution of the first program stream resumes at a subsequent program counter at which the interruption occurred. Thus, all information corresponding to the first program stream is typically saved prior to servicing of the interrupting second program stream.

Of course, with such a system, it must be guaranteed that all interrupted program stream parameters are restored before the execution of the first program stream resumes. If during this transfer an interrupt occurs, then all data may not be stored or restored. If the error free storage of the program register contents and other critical first program stream data does not occur, the processor has no way of knowing whether the first program stream data restored to the registers has become corrupt or not. In order to ensure that all first program stream data is transferred, the interrupting task must wait until the restoration process is completed, which wastes valuable processing time and results in increased power consumption.

A need therefore exists to facilitate processing of interrupting program streams without storing and restoring interrupted program stream critical data. It is therefore an object of the invention to provide a system for facilitating the execution of an interrupting program stream without storing and restoring interrupted program stream critical data.

SUMMARY OF THE INVENTION

In accordance with the invention there is provided a system comprising a processor; a plurality of register bank blocks; and, a register bank block decoder circuit for activating one and only one of the plurality of register bank blocks, the register bank block decoder circuit responsive to interrupt event operations for selecting the one of the plurality of register bank blocks for being activated, where different interrupt event operations result in selection of different ones of the plurality of register bank blocks.

In accordance with the invention there is provided a method of switching processing resources in a data processing system comprising the steps of: providing a plurality of register bank blocks; utilizing a first register bank block from the plurality of register bank blocks for data processing; receiving of an interrupt request for initiating an interrupt event; determining if the interrupt request is to be fulfilled, and if so, then selecting a second register bank block from the plurality of register bank blocks, the selected second register bank block in isolation from the first register bank block; and, utilizing the second register bank block from the plurality of register bank blocks for data processing.

In accordance with the invention there is provided a storage medium having data stored thereon, the data for implementation of a processing system comprising: first instruction data for providing a plurality of register bank blocks; and, second instruction data for providing a register bank block decoder circuit for activating one of the plurality of register bank blocks in isolation, the register bank block decoder circuit responsive to interrupt event operations for selecting the one of the plurality of register bank blocks for being activated, where different interrupt event operations result in selection of different ones of the plurality of register bank blocks.

Exemplary embodiments of the invention will now be described in conjunction with the following drawings, in which.

Figure 1:
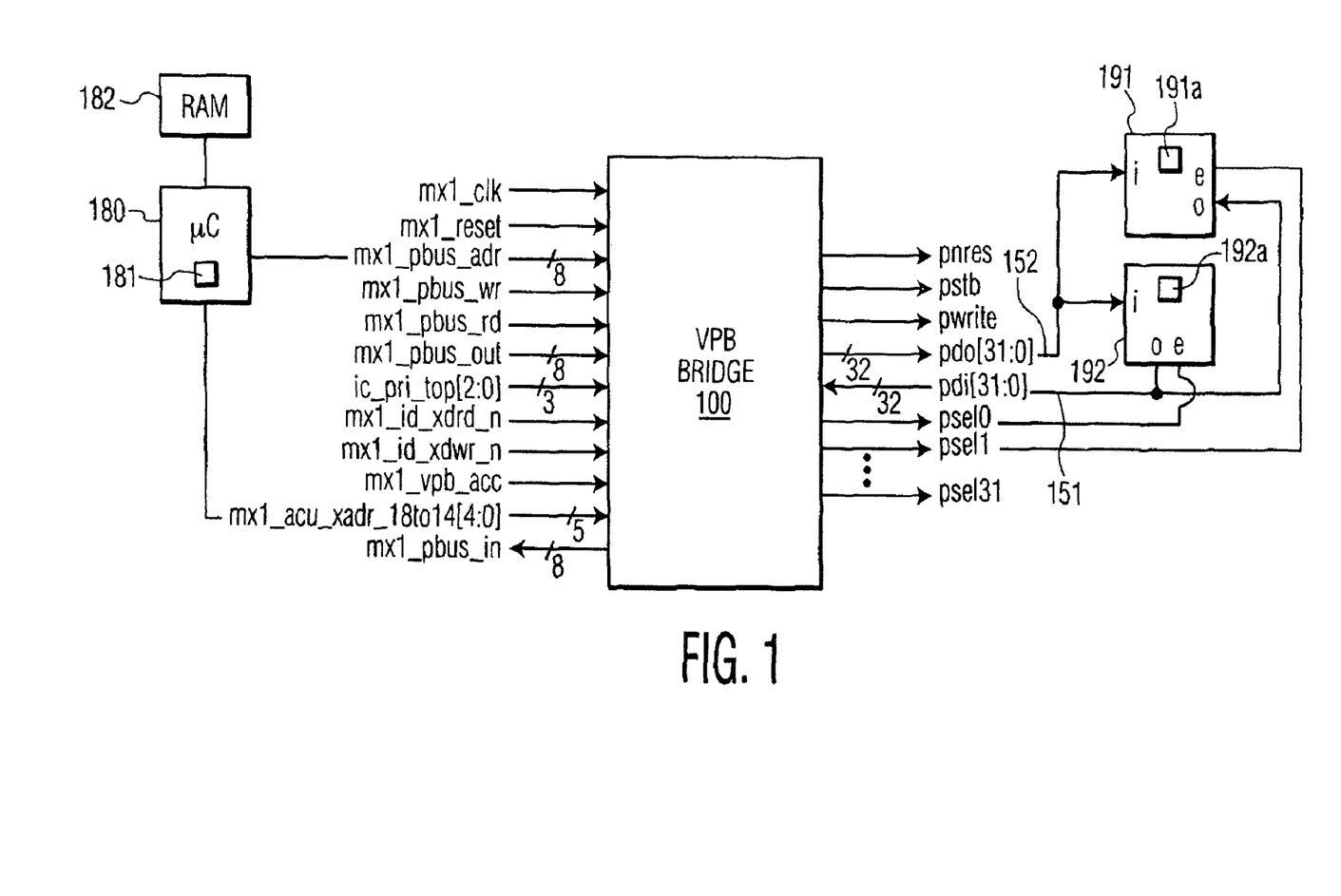
FIG. 1 illustrates a very large scale integration (VLSI) Peripheral Bus Bridge (VPB bridge), as a high level diagram, in accordance with a first embodiment of the invention.

FIG. 1 illustrates a very large scale integration (VLSI) Peripheral Bus Bridge (VPB bridge) 100, as a high level diagram, in accordance with a first embodiment of the invention. A processor 180, or microcontroller, is coupled to the VPB bridge 100 and to a memory circuit 182, in the form of a random access memory (RAM), or external high data memory (HDATA). Disposed within the processor is a plurality of general special function registers (GSFRs) disposed within a general special function register (GSFR) block 181. A first plurality of input ports is provided on the VPB bridge for receiving of input signals and a second plurality of output ports is provided thereon for providing of output signals. Table 1 illustrates the input and output signals that are provided to and from the VPB bridge 100.

As illustrated in FIG. 1, two peripheral devices 191 and 192 are connected to the 32 bit peripheral data output bus, pdo[31:0] 152 and to the 32 bit peripheral data input bus, pdi[31:0] 151. The peripheral 0 select signal, psel0, is provided to an enable port on the first peripheral device 191 and the peripheral 1 select signal, psel1, is provided to an enable port on the second peripheral device 192. The peripheral select signals, psel0 to psel31 listed in Table 1, are used to selectively enable and disable the peripheral devices 191 and 192. Input and output signals provided to and from the VPB bridge 100 are summarized in Table 1.

TABLE 1

Input and Output Signals Provided to and From the VPB bridge

| Name | Direction | Width | Function |
|---|---|---|---|
| mx1_clk | IN | 1 | Clock Signal |
| mx1_reset | IN | 1 | Reset Signal |
| mx1_pbus_adr | IN | 8 | Peripheral bus (Pbus) Special Function Register (SFR) address |
| mx1_pbus_wr | IN | 1 | Pbus write select signal |
| mx1_pbus_rd | IN | 1 | Pbus read select signal |
| mx1_pbus_out | IN | 8 | Write data for the selected VPB SFR register. |
| ic_pri_top[2:0] | IN | 3 | VPB data register bank selection. 000 - Bank 0, No interrupt are active. 001 - Bank 1, Interrupt of priority level 0 is active. 010 - Bank 2, Interrupt of priority level 1 is active 011 - Bank 3, Interrupt of priority level 2 is active 100 - Bank 4, Interrupt of priority level 3 is active 101 - Bank 5, Interrupt of priority level 4 (Debug Interrupt) is active 110 - Selects bank 0 111 - Selects bank 0. |
| mx1_id_xdrd_n | IN | 1 | HDATA read signal. |
| mx1_id_xdwr_n | IN | 1 | HDATA write signal. |
| mx1_vpb_acc | IN | 1 | Memory address decoder identifies the target address as a VPB access. |
| mx1_pbus_in | OUT | 8 | Read data from the selected VPB register. Assigned 0x00 when the VPB registers are not selected for read operation. |
| mx1_acu_xadr_18 to14 | IN | 5 | HDATA memory address bus. acu_xadr[13:0] is not routed through the bridge. acu_xadr[18:14] is decoded to select the VPB peripheral. |

TABLE 1-continued

Input and Output Signals Provided to and From the VPB bridge

| Name | Direction | Width | Function |
|---|---|---|---|
| pnres | OUT | 1 | Active LOW signal to reset the VPB devices. |
| pstb | OUT | 1 | Signal from the VPB bridge to time data transfer cycles on the peripheral bus. |
| pwrite | OUT | 1 | Data transfer direction. HIGH indicates a peripheral write cycle. LOW indicates a read cycle. |
| pdo | OUT | 32 | VPB peripheral data output bus. pdo[7:0] = vpbd0, pdo[15:8] = vpbd1, pdo[23:16] = vpbd2 and pdo[31:24] = vpbd3. |
| pdi | IN | 32 | VPB peripheral data input bus. vpbd0 = pdi[7:0], vpbd1 = pdi[15:8], vpbd2 = pdi[23:16] and vpbd3 = pdi[31:24]. |
| psel0 | OUT | 1 | VPB peripheral 0 select signal. |
| psel1 | OUT | 1 | VPB peripheral 1 select signal. |
| psel2 | OUT | 1 | VPB peripheral 2 select signal. |
| psel3 | OUT | 1 | VPB peripheral 3 select signal. |
| psel4 | OUT | 1 | VPB peripheral 4 select signal. |
| psel5 | OUT | 1 | VPB peripheral 5 select signal. |
| psel6 | OUT | 1 | VPB peripheral 6 select signal. |
| psel7 | OUT | 1 | VPB peripheral 7 select signal. |
| psel8 | OUT | 1 | VPB peripheral 8 select signal. |
| psel9 | OUT | 1 | VPB peripheral 9 select signal. |
| psel10 | OUT | 1 | VPB peripheral 10 select signal. |
| psel11 | OUT | 1 | VPB peripheral 11 select signal. |
| psel12 | OUT | 1 | VPB peripheral 12 select signal |
| psel13 | OUT | 1 | VPB peripheral 13 select signal |
| psel14 | OUT | 1 | VPB peripheral 14 select signal |
| psel15 | OUT | 1 | VPB peripheral 15 select signal |
| psel16 | OUT | 1 | VPB peripheral 16 select signal |
| psel17 | OUT | 1 | VPB peripheral 17 select signal |
| psel18 | OUT | 1 | VPB peripheral 18 select signal |
| psel19 | OUT | 1 | VPB peripheral 19 select signal |
| psel20 | OUT | 1 | VPB peripheral 20 select signal |
| psel21 | OUT | 1 | VPB peripheral 21 select signal |
| psel22 | OUT | 1 | VPB peripheral 22 select signal |
| psel23 | OUT | 1 | VPB peripheral 23 select signal |
| psel24 | OUT | 1 | VPB peripheral 24 select signal |
| psel25 | OUT | 1 | VPB peripheral 25 select signal |
| psel26 | OUT | 1 | VPB peripheral 26 select signal |
| psel27 | OUT | 1 | VPB peripheral 27 select signal |
| psel28 | OUT | 1 | VPB peripheral 28 select signal |
| psel29 | OUT | 1 | VPB peripheral 29 select signal |
| psel30 | OUT | 1 | VPB peripheral 30 select signal |
| psel31 | OUT | 1 | VPB peripheral 31 select signal |

Though, only 32 VPB peripheral device select signals are listed in Table 1, the VPB bridge is not limited to only 32 peripheral device select signals, the number of peripheral device select signals is a matter of design choice.

Figure 2:
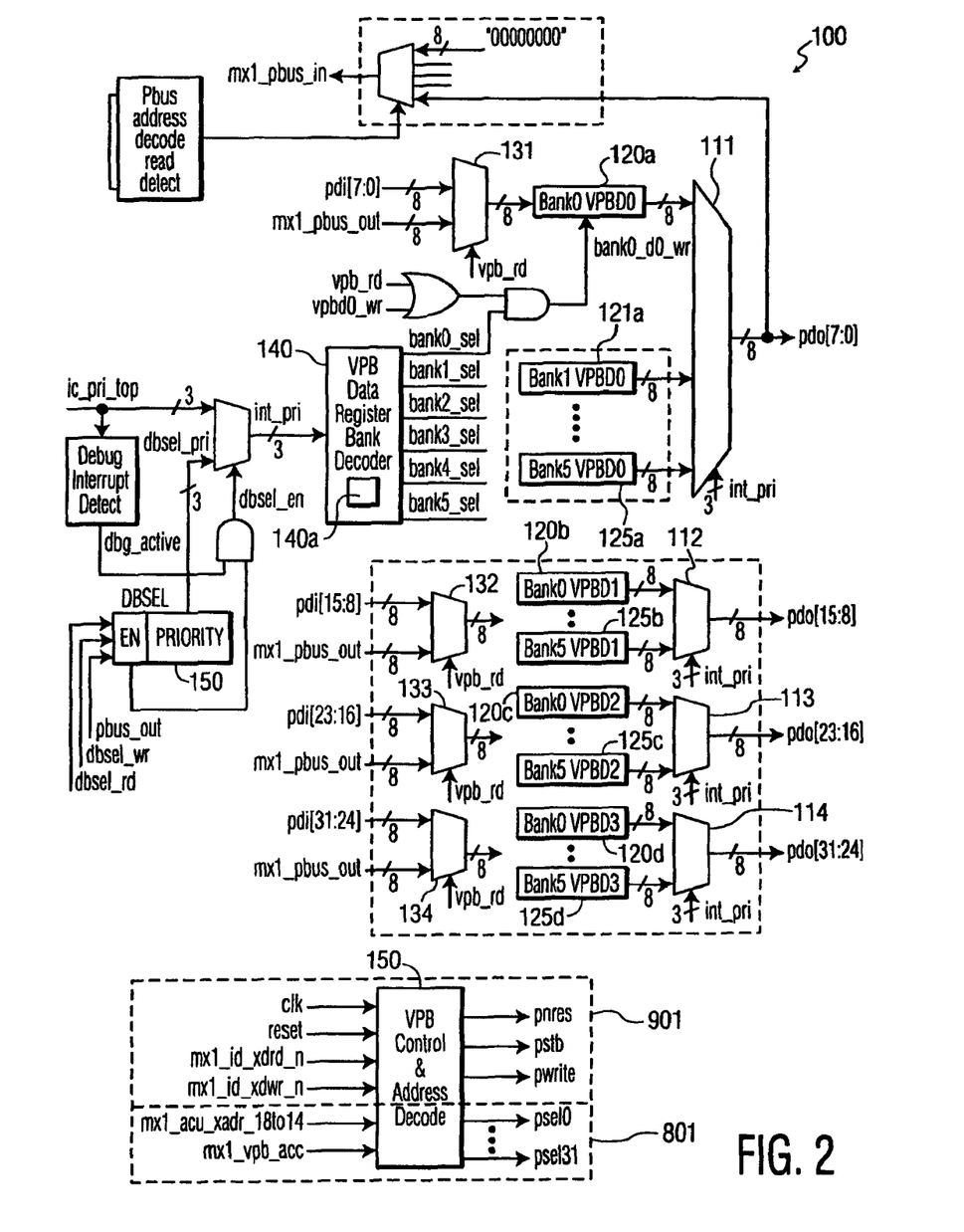
FIG. 2 illustrates the VLSI Peripheral Bus Bridge (VPB bridge) shown in FIG. 1, as a low level diagram, showing circuit blocks making up the VPB Bridge.

FIG. 2 illustrates a low level diagram of the VPB bridge 100 shown in FIG. 1. The VPB bridge 100 enables interfacing of a plurality of output switching circuits, in the form of 8 bit output multiplexers (MUXs), 111, 112, 113 and 114, to the 32 bit peripheral data output bus, pdo[31:0], coupled to the peripheral devices, 191 and 192, for providing of a 32-bit output signal thereto. A first output MUX 111 provides a first set of 8 data output bits, pdo[7:0], a second output MUX 112 provides a second set of 8 data output bits, pdo[15:8], a third output MUX 113 provides a third set of 8 data output bits, pdo[23:16], and a fourth output MUX 114 provides a fourth set of 8 data output bits, pdo[31:24]. The first through fourth set of 8-bit data output signals make up the 32-bit data output signal provided to the 32 bit peripheral devices. Likewise, the peripheral devices provide a 32-bit output signal to the bridge 100 on a peripheral data input bus, pdi[31:0]. A first set of 8-bit input signals, pdi[7:0] is provided to input ports of a first input MUX 131, a second set of 8-bit input signals, pdi[15:8]

is provided to input ports of a second input MUX 132, a third set of 8-bit input signals, pdi[23:16] is provided to input ports of a third input MUX 133, and a fourth set of 8-bit input signals, pdi[31:24] is provided to input ports of a fourth input MUX 134.

A first set of six 8-bit registers, 120a through 125a, belonging to a plurality of register bank blocks, Bank0 to Bank5, is coupled between six 8-bit output ports of a first input switching circuit in the form of a first input MUX 131 and six 8-bit input ports of the first output MUX 111. This first set of registers is for storing of 8-bits of data received from the peripheral data input bus, pdi[7:0].

A second set of six 8-bit registers, 120b through 125b, belonging to a plurality of register bank blocks, Bank0 to Bank5, is coupled between six 8-bit output ports of the second switching circuit in the form of a second input MUX 132 and six 8-bit input ports of the second output MUX 112. This second set of registers is for storing of 8-bits of data received from the peripheral data input bus, pdi[15:8].

A third set of six 8-bit registers, 120c through 125c, belonging to a plurality of register bank blocks, Bank0 to Bank5, is coupled between six 8-bit output ports of the third input switching circuit in the form of a third input MUX 133 and six 8-bit input ports of the third output MUX 113. This third set of registers is for storing of 8-bits of data received from the peripheral data input bus, pdi[23:16].

A fourth set of six 8-bit registers, 120d through 125d, belonging to a plurality of register bank blocks, Bank0 to Bank5, is coupled between six 8-bit output ports of the fourth input switching circuit in the form of a fourth input MUX 134 and six 8-bit input ports of the fourth output MUX 114. This fourth set of registers is for storing of 8-bits of data received from the peripheral data input bus, pdi[31:24]. Registers 120a, 120b, 120c and 120d form a first register bank block 120 from the plurality of register bank blocks. Registers 121a, 121b, 121c and 121d form a second register bank block 121 from the plurality of register bank blocks. Registers 122a, 122b, 122c and 122d form a third register bank block 122 from the plurality of register bank blocks. Registers 123a, 123b, 123c and 123d form a fourth register bank block 123 from the plurality of register bank blocks. Registers 124a, 124b, 124c and 124d form a fifth register bank block 124 from the plurality of register bank blocks. Registers 125a, 125b, 125c and 125d form a sixth register bank block 125 from the plurality of register bank blocks.

Figure 3:
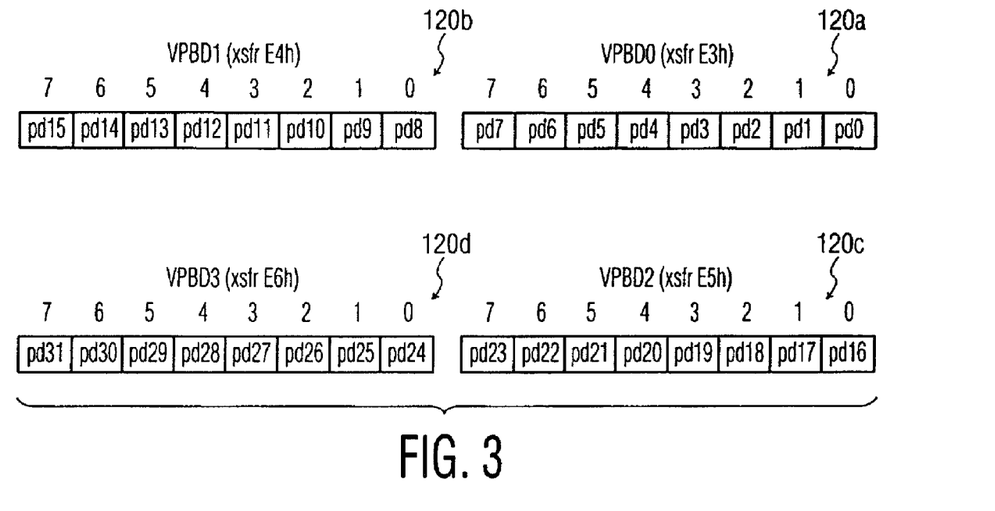
FIG. 3 illustrates four 8-bit registers, for example Bank0 registers VPBD0 to VPBD3.
Figure 4:
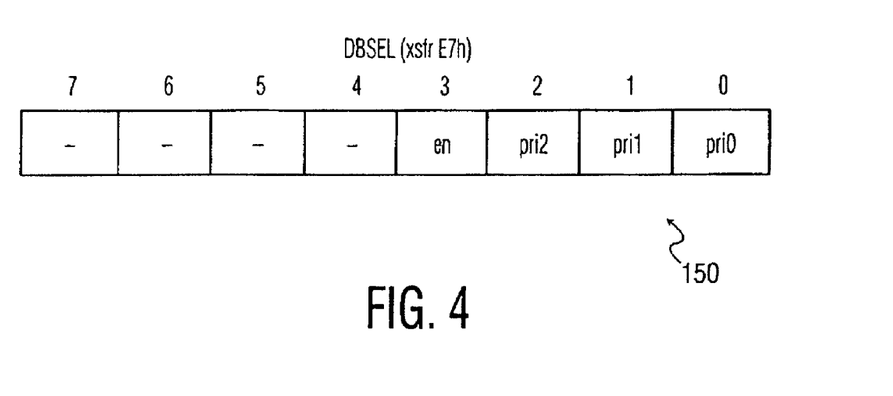
FIG. 4 illustrates a Debug Bank Select (DBSEL) register, where the DBSEL register is provided for enhanced debug visibility of the VPB data register banks.

FIG. 3 illustrates four 8-bit registers, for example Bank0 registers VPBD0 to VPBD3, 120a through 120d; These registers allow 8 bit data transfer to the input ports of the output MUXs, 111, 112, 113 and 114, and 32-bit data transfers to the peripheral devices connected to the output ports thereof. Reading or writing of 32 bits of data on the output MUX output port side is performed in 4 steps of 8-bit read or write operations, respectively. FIG. 4 illustrates a Debug Bank Select (DBSEL) register 150, where the DBSEL register 150 is provided for enhanced debug visibility of the data register banks, Bank0 to Bank5. This register is preferably read and written when a debug interrupt is active.

Figure 5:
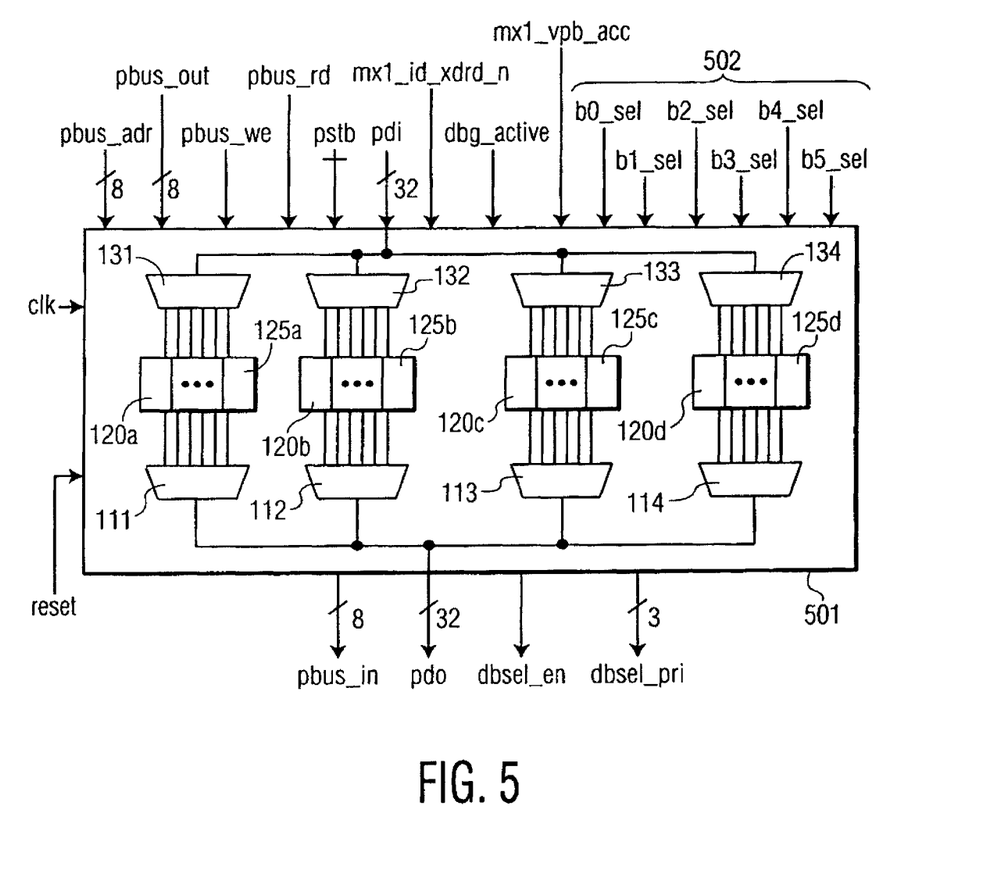
FIG. 5 illustrates a high level diagram of special function register (SFR) block used within the VPB bridge.

FIG. 5 illustrates a high level diagram of special function register (SFR) block 501 used within the VPB bridge 100. The SFR block 501 is used for implementing of the VPBD0, VPBD1, VPBD2, VPBD3 registers used within register banks Bank0 to Bank5. Additionally, the SFR block 501 is used for implementing of the DBSEL register 150. Table 2 illustrates the input and output signals that are provided to the SFR block 501.

TABLE 2

Input and Output Signals Provided to and From the SFR Block

| Name | Direction | Width | Function |
| --- | --- | --- | --- |
| pbus_adr | IN | 8 | Peripheral bus address from the gsfr block. |
| pbus_out | IN | 8 | Peripheral data input from the gsfr block. |
| pbus_we | IN | 1 | Peripheral write strobe from the gsfr block. |
| pbus_rd | IN | 1 | Peripheral read strobe from the gsfr block. |
| pdi | IN | 32 | Data input from VPB peripheral device. |
| mx1_id_xdrd_n | IN | 1 | HDATA read signal. Used to detect VPB read. |
| mx1_vpb_acc | IN | 1 | Memory address decoder identifies the target address as a VPB access. Used to detect vpb read |
| pstb | IN | 1 | Signal from a VPB control block to time data transfer cycles. Used to detect vpb read. |
| b0_sel | IN | 1 | Data Register Bank 0 select signal. Masked or actual Interrupt priority level is 0. |
| b1_sel | IN | 1 | Data Register Bank 1 select signal. Masked or actual Interrupt priority level is 1. |
| b2_sel | IN | 1 | Data Register Bank 2 select signal. Masked or actual Interrupt priority level is 2. |
| b3_sel | IN | 1 | Data Register Bank 3 select signal. Masked or actual Interrupt priority level is 3. |
| b4_sel | IN | 1 | Data Register Bank 4 select signal. Masked or actual Interrupt priority level is 4. |
| b5_sel | IN | 1 | Data Register Bank 5 select signal. Masked or actual Interrupt priority level is 5. |
| clk | IN | 1 | CPU clock input. |
| reset | IN | 1 | CPU reset input. |
| pbus_in | OUT | 8 | Peripheral data output to the GSFR block. |
| pdo | OUT | 32 | Data output signal to VPB peripheral device. |
| dbsel_en | OUT | 1 | Bit 3 of DBSEL register. |
| dbsel_pri | OUT | 3 | Bit 2-Bit 0 of DBSEL register. |

Input ports 502 are used for receiving data register bank select signals for selecting of a register bank to activate for access thereto. Disposed within the SFR block 501 are the first through fourth input MUXs, 131 to 134, the first through fourth register banks, and the first through fourth output MUXs, 111 to 114.

Figure 6:
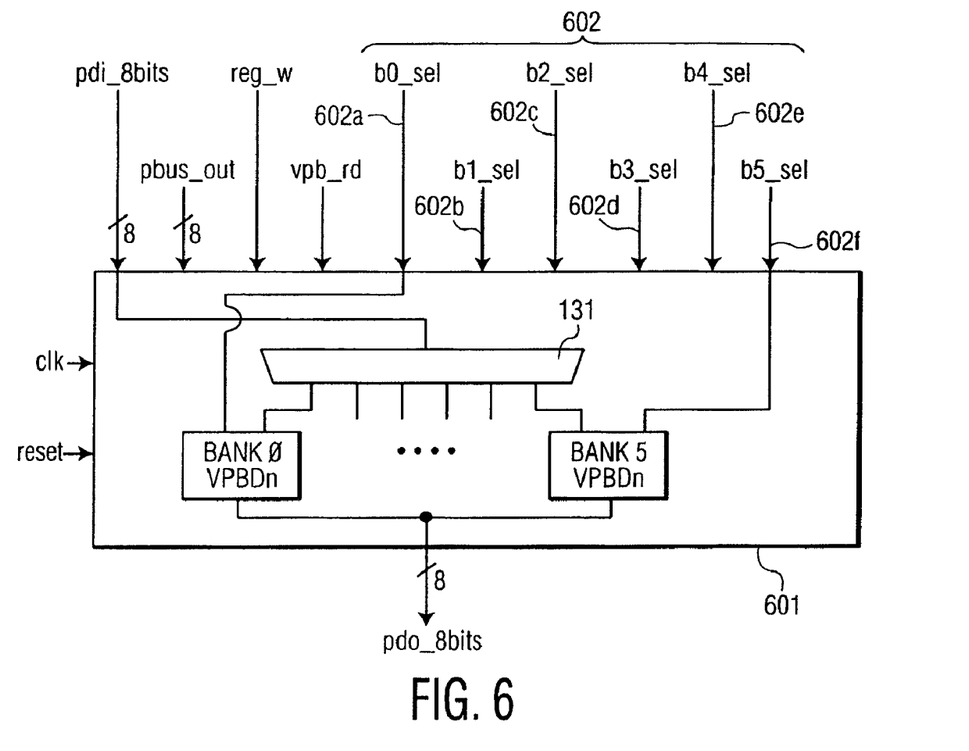
FIG. 6 illustrates a register bank block that comprises six 8-bit data register, for example registers VPBD0 through VPBD5 corresponding to Bank0 through Bank5 and an input data multiplexer (MUX)

FIG. 6 illustrates a register bank block 601 that comprises six 8-bit data registers, for example registers VPBD0 through VPBD5 corresponding to Bank0 through Bank5 and an input data MUX 131 (FIG. 2). Four register bank blocks 601 are used within the VPB bridge 100 with each coupled to a respective data output MUX. As is illustrated in FIG. 2, a first register bank block includes input MUX 131 and Bank0 through Bank5 VPBD0 registers, 120a through 125a. A second register bank block includes input MUX 132 and Bank0 through Bank5 VPBD1 registers, 120b through 125b. A third register bank block includes input MUX 133 and Bank0 through Bank5 VPBD2 registers, 120c through 125c. A fourth register bank block includes input MUX 134 and Bank0 through Bank5 VPBD3 registers, 120d through 125d. The first through fourth register bank blocks are coupled to first through fourth input ports of the data output MUXs, 111, 112, 113, and 114, respectively. Input and output signals provided to and from a single register bank are summarized in Table 3.

TABLE 3

Input and Output Signals
Provided to and From a single register bank

| Name | Direction | Width | Function |
|---|---|---|---|
| pdi_8bits | IN | 8 | 8 bit Input data from the VPB peripheral. |
| pbus_out | IN | 8 | Peripheral data input from the gsfr block. |
| reg_w | IN | 1 | Register write strobe. |
| vpb_rd | IN | 1 | VPB read. Used to switch input data mux. |
| b0_sel | IN | 1 | Data Register Bank 0 select signal. Masked or actual Interrupt priority level is 0. |
| b1_sel | IN | 1 | Data Register Bank 1 select signal. Masked or actual Interrupt priority level is 1. |
| b2_sel | IN | 1 | Data Register Bank 2 select signal. Masked or actual Interrupt priority level is 2. |
| b3_sel | IN | 1 | Data Register Bank 3 select signal. Masked or actual Interrupt priority level is 3. |
| b4_sel | IN | 1 | Data Register Bank 4 select signal. Masked or actual Interrupt priority level is 4. |
| b5_sel | IN | 1 | Data Register Bank 5 select signal. Masked or actual Interrupt priority level is 5. |
| clk | IN | 1 | CPU clock signal. |
| reset | IN | 1 | CPU reset signal. |
| pdo_8bits | OUT | 8 | Data output to the VPB SFR block and VPB peripheral devices. |

Figure 7:
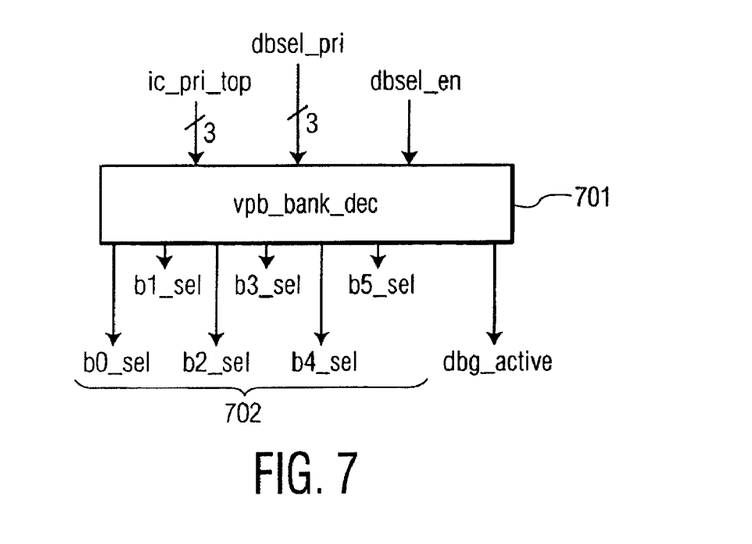
FIG. 7 illustrates a register bank decoder circuit that includes the VPB data register bank decoder.

FIG. 7 illustrates a register bank block decoder circuit 701 that includes the VPB data register bank decoder 140. The register bank block decoder circuit 701 is responsive to interrupt event operations for selecting one of the plurality of register bank blocks for being activated, where different interrupt event operations result in selection of different ones of the plurality of register bank blocks. Furthermore, the register bank block decoder circuit 701 functions as an interrupt priority determination logic circuit that receives an interrupt request and determines a priority of the interrupt request. In dependence upon the determined priority, the register bank decoder circuit 701 provides a register bank block selection signal, bank0_sel, bank1_sel, bank2_sel, bank3_sel, bank4_sel, and bank5_sel, to a respective bank selection input port, 602a through 602f, from the plurality of bank selection input ports 602. Referring to Table 4, input and output signals provided to and from the register bank decoder circuit are summarized.

TABLE 4

Input and Output Signals Provided to
and From the register bank decoder circuit

| Name | Direction | Width | Function |
|---|---|---|---|
| ic_pri_top | IN | 3 | Interrupt priority level, used to generate data register bank select signal. |
| dbsel_en | IN | 1 | Bit 3 of DBSEL SFR. |
| dbsel_pri | IN | 3 | Priority level from DBSEL SFR. |
| b0_sel | OUT | 1 | Data Register Bank 0 select signal. Masked or actual Interrupt priority level is 0. |
| b1_sel | OUT | 1 | Data Register Bank 1 select signal. Masked or actual Interrupt priority level is 1. |
| b2_sel | OUT | 1 | Data Register Bank 2 select signal. Masked or actual Interrupt priority level is 2. |
| b3_sel | OUT | 1 | Data Register Bank 3 select signal. Masked or actual Interrupt priority level is 3. |
| b4_sel | OUT | 1 | Data Register Bank 4 select signal. Masked or actual Interrupt priority level is 4. |
| b5_sel | OUT | 1 | Data Register Bank 5 select signal. Masked or actual Interrupt priority level is 5. |

The register bank decoder circuit 701 decodes the ic_pri_top signal to generate register bank select signals at register bank select output ports 702. These register bank select output ports 702 are coupled to register select input ports 502 of the SFR block 501. This circuit 702 also detects debug interrupt level and uses a dbsel_pri input signal to generate select signals if a dbsel_en signal is set.

Figure 8:
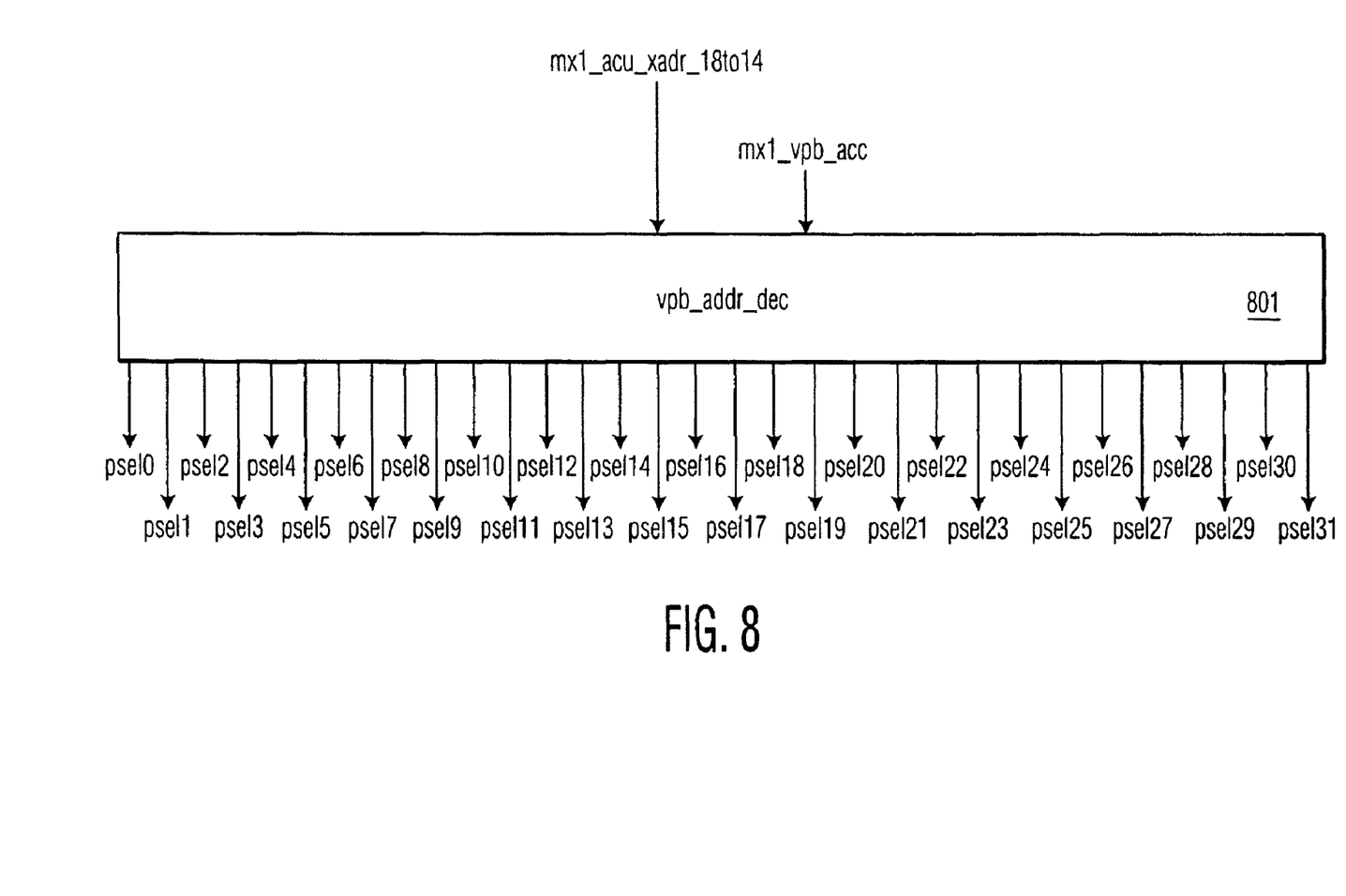
FIG. 8 illustrates an address decoder circuit used for decoding of an ic_pri_top signal to generate register bank select signals.

FIG. 8 illustrates an address decoder circuit 801 used for decoding of the ic_pri_top signal to generate register bank select signals. Input and output signals provided to and from the address decoder circuit 801 are summarized in Table 5.

TABLE 5

Input and Output Signals Provided
to and from the address decoder circuit

| Name | Direction | Width | Function |
|---|---|---|---|
| mx1_vpb_acc | IN | 1 | Memory address decoder identifies the target address as a VPB access. |
| mx1_acu_xadr_18to14 | IN | 5 | HDATA memory address bus. acu_xadr[13:0] is not routed through the VPB bridge. acu_xadr[18:14] is decoded to select the VPB peripheral device. |
| psel0 | OUT | 1 | VPB peripheral 0 select signal. |
| psel1 | OUT | 1 | VPB peripheral 1 select signal. |
| psel2 | OUT | 1 | VPB peripheral 2 select signal. |
| psel3 | OUT | 1 | VPB peripheral 3 select signal. |
| psel4 | OUT | 1 | VPB peripheral 4 select signal. |
| psel5 | OUT | 1 | VPB peripheral 5 select signal. |
| psel6 | OUT | 1 | VPB peripheral 6 select signal. |
| psel7 | OUT | 1 | VPB peripheral 7 select signal. |
| psel8 | OUT | 1 | VPB peripheral 8 select signal. |
| psel9 | OUT | 1 | VPB peripheral 9 select signal. |
| psel10 | OUT | 1 | VPB peripheral 10 select signal. |
| psel11 | OUT | 1 | VPB peripheral 11 select signal. |
| psel12 | OUT | 1 | VPB peripheral 12 select signal. |
| psel13 | OUT | 1 | VPB peripheral 13 select signal. |
| psel14 | OUT | 1 | VPB peripheral 14 select signal. |
| psel15 | OUT | 1 | VPB peripheral 15 select signal. |
| psel16 | OUT | 1 | VPB peripheral 16 select signal. |
| psel17 | OUT | 1 | VPB peripheral 17 select signal. |
| psel18 | OUT | 1 | VPB peripheral 18 select signal. |
| psel19 | OUT | 1 | VPB peripheral 19 select signal. |
| psel20 | OUT | 1 | VPB peripheral 20 select signal. |
| psel21 | OUT | 1 | VPB peripheral 21 select signal. |
| psel22 | OUT | 1 | VPB peripheral 22 select signal. |
| psel23 | OUT | 1 | VPB peripheral 23 select signal. |
| psel24 | OUT | 1 | VPB peripheral 24 select signal. |
| psel25 | OUT | 1 | VPB peripheral 25 select signal. |
| psel26 | OUT | 1 | VPB peripheral 26 select signal. |
| psel27 | OUT | 1 | VPB peripheral 27 select signal. |
| psel28 | OUT | 1 | VPB peripheral 28 select signal. |
| psel29 | OUT | 1 | VPB peripheral 29 select signal. |
| psel30 | OUT | 1 | VPB peripheral 30 select signal. |
| psel31 | OUT | 1 | VPB peripheral 31 select signal. |

Figure 9:
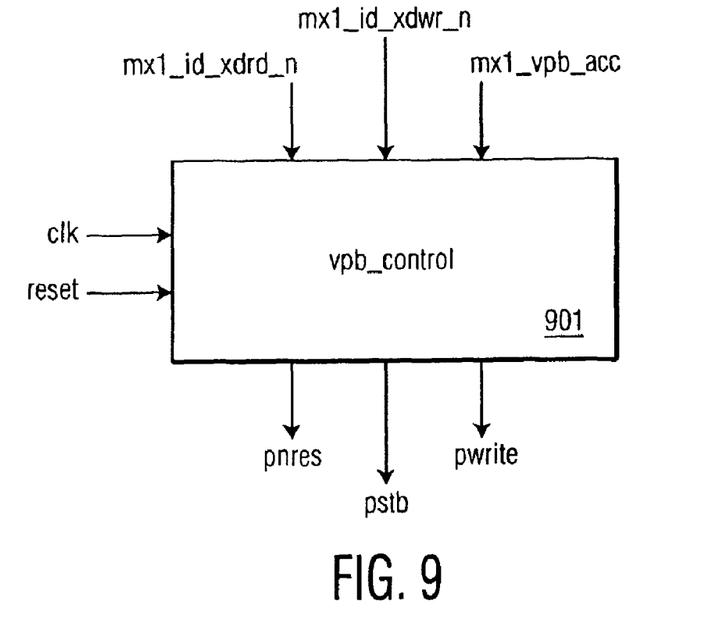
FIG. 9 illustrates a VPB bridge control block circuit for generating of pnres, pstb and pwrite control signals.

FIG. 9 illustrates a VPB control block circuit 901 for generating of pnres, pstb and pwrite control signals. Table 6 summarizes the input and output signals provided to and from the VPB control block circuit 901.

TABLE 6

Input and Output Signals Provided
to and from the VPB address decoder circuit

| Name | Direction | Width | Function |
|---|---|---|---|
| mx1_id_xdrd_n | IN | 1 | HDATA read signal. Used to detect vpb read. |
| mx1_id_xdwr_n | IN | 1 | HDATA write signal. Used to detect vpb write. |
| mx1_vpb_acc | IN | 1 | Memory address decoder identifies the target address as a VPB access. Used to detect vpb read or write. |
| clk | IN | 1 | clock input. |
| reset | IN | 1 | reset input. |

TABLE 6-continued

Input and Output Signals Provided
to and from the VPB address decoder circuit

| Name | Direction | Width | Function |
|------|-----------|-------|----------|
| pnres | OUT | 1 | Active LOW signal to reset the VPB devices. |
| pstb | OUT | 1 | Signal from the VPB bridge to time data transfer cycles on the peripheral bus. |
| Pwrite | OUT | 1 | Data transfer direction. HIGH indicates a peripheral write cycle. LOW indicates a read cycle. |

Referring back to FIGS. 1 and 2, processes of writing of 32-bit data to the input ports of the output MUXs is performed in 4 steps—4 8-bit write operations. A process of reading of 32-bit data from the output ports of the data input MUXs is performed in 4 steps—4 8-bit read operations. Advantageously, these operations are interruptible during any step, since each interrupt level is provided with a private bank of VPBD0-VPBD3 registers. At any given time, preferably a maximum of 6 interrupt levels are activatable in the present exemplary embodiment. Switching between the banks of registers is controlled by an interrupt priority level signal (ic_pri_top) and the DBSEL SFR 150.

Figure 10:
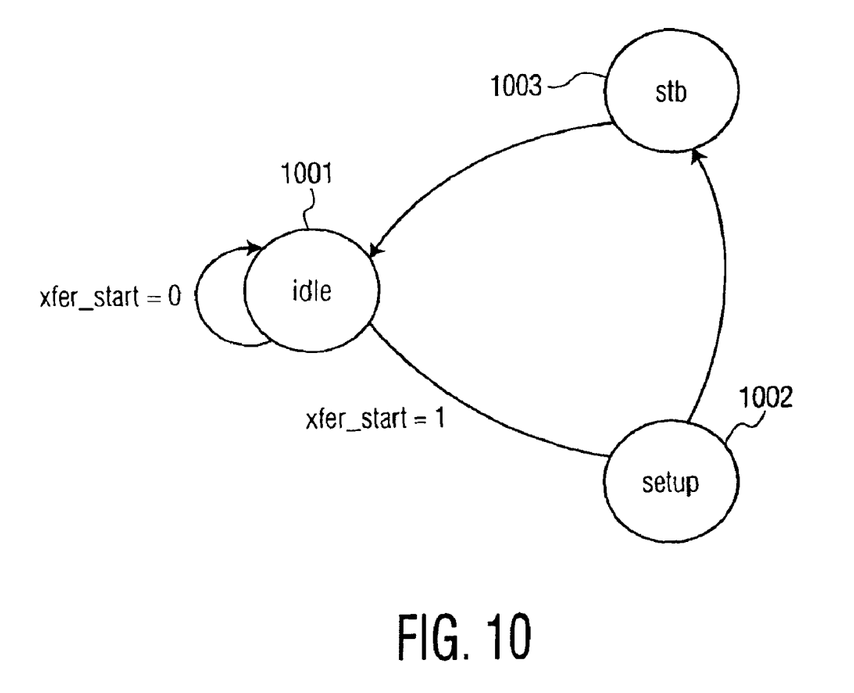
FIG. 10 illustrates a VPB bridge state machine diagram.

FIG. 10 illustrates a VPB bridge state machine diagram, wherein data is transferred using the VPB bridge when the following relation is satisfied:
xfer_start<=mxl_vpb_acc AND ((NOT mxl_id_xdrd_n) OR (NOT mxl_id_xdwr_n))

The VPB bridge 100 remains idle, step 1001, while xfer_start=0, once xfer_start=1, setup operations are performed, where the output signals and the ports for receiving of input signals are selected, in step 1002. Once setup is complete, a strobe signal is provided, step 1003, and the output signals are provided from the VPB bridge 100 and the input signals are received by the VPB bridge. Thereafter, the VPB bridge 100 returns to an idle state, step 1001.

Figure 11:
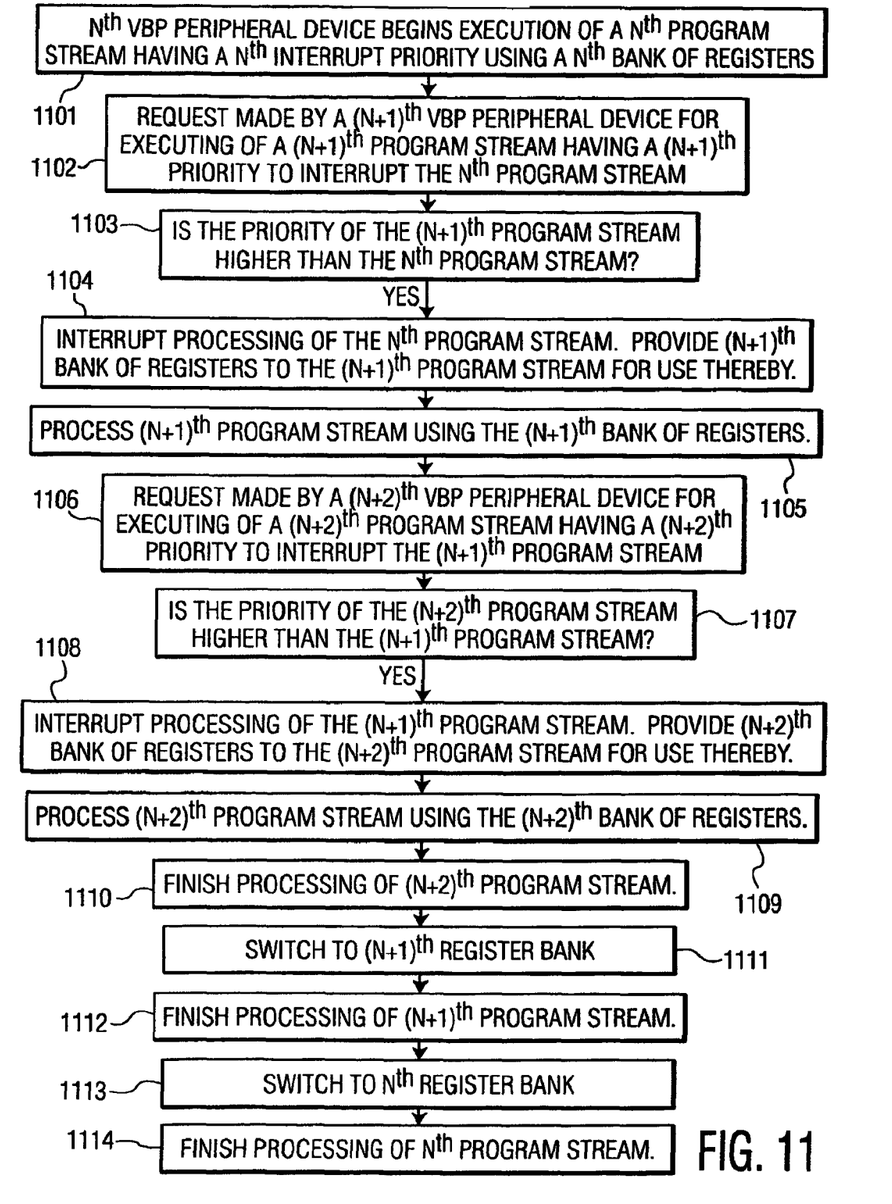
FIG. 11 illustrates a flowchart showing a sequence of events that occur for executing of program streams using the VPB bridge.

Referring to FIG. 11, a flowchart is shown that illustrates a sequence of events that occur for executing of program streams using the VPB bridge 100. The processor 180 is used to execute each of the program streams. A $N^{th}$ VPB peripheral device begins execution of a $N^{th}$ program stream having a $N^{th}$ interrupt priority using a $N^{th}$ bank of registers, in step 1101. A request is made by a $(N+1)^{th}$ VPB peripheral device for executing of a $(N+1)^{th}$ program stream having a $(N+1)^{th}$ priority for interrupting of the $N^{th}$ program stream, step 1102. A determination is made as to whether the priority of the $(N+1)^{th}$ program stream is higher than the $N^{th}$ program stream, in step 1103. If so, then processing of the $N^{th}$ program stream by the processor 180 is interrupted and a $(N+1)^{th}$ bank of registers is switchably coupled to the processor for processing of the $(N+1)^{th}$ program stream, in step 1104. Processing of the $(N+1)^{th}$ program stream commences using the $(N+1)^{th}$ bank of registers, in step 1105. A request is now made by a $(N+2)^{th}$ VPB peripheral device for executing of a $(N+2)^{th}$ program stream having a $(N+2)^{th}$ priority for interrupting of the $(N+1)^{th}$ program stream, in step 1106. A determination is made as to whether the priority of the $(N+2)^{th}$ program stream higher than the $(N+1)^{th}$ program stream, in step 1107. If so, then processing of the $(N+1)^{th}$ program stream is interrupted and a $(N+2)^{th}$ bank of registers are provided to the processor for processing of the $(N+2)^{th}$ program stream, in step 1108. The processor 180 then uses the $(N+2)^{th}$ bank of registers to process the $(N+2)^{th}$ program stream, in step 1109. Once the processing of the $(N+2)^{th}$ program stream is finished, in step 1110, the processor is switched to the $(N+1)^{th}$ register bank, in step 1111, and processing of $(N+1)^{th}$ program stream is finished, in step 1112. Thereafter, the $N^{th}$ register bank is switched to, step 1113, and processing of $N^{th}$ program stream is finished 1114.

Thus, if there are N levels of interrupt priority then N+1 register bank blocks are provided, which also includes the case where no interrupts are active. If the VPB peripheral device is performing a transfer of data to or from the bank registers and an interrupt of higher priority occurs, and is accepted, then a different set of register banks are made accessible to the interrupting second program stream. These interruptions and provisions of new register banks occur up to a maximum interrupt priority. Once the highest priority program stream completes, then the next lower one is directed to continue until it completes or is interrupted again by a higher interrupt priority program stream. Thus, completion of VPB peripheral information transfer is facilitated for any sequence of interrupts, with no requirements being placed on any interrupt routines to store and restore any SFR information.

For the exemplary architecture illustrated, at any time, a maximum number of active interrupt levels preferably does not exceed 6. Each interrupt level is provided with a private bank of VPBD0-VPBD3 registers for exclusive use by that interrupt. By implementing different register banks for use by different interrupting program streams, save and restore register operations in the interrupt handler are obviated. This saves valuable processing resources and provides reduced power consumption, since every time that a store and restore operation is performed, logic gates are enabled and disabled, thus wasting electrical power. That said, the faster the processing time for storing and restoring registers, the more power that is consumed by the processing system.

Of course, for system debugging purposes, when the debug mode is active, all register banks are accessible. By setting bit D3, EN, in the DBSEL register 150. Bits D0-D2 of DBSEL register are used to select the bank. Advantageously, the VPB bridge 100 implements 3 clock VPB bus cycle and does not support "perr" and "prdy" signals. Each VPB peripheral is allocated memory space within the memory circuit 182. Address lines and clock signals for VPB peripherals are not routed through the bridge. Memory address lines (mxl_acu_xadr[13:0]) are directly connected to the peripheral address lines (pa[13:0]). CPU clock (mxl_clk) is directly connect to the peripheral clock(pclk). For the current implementation shown, up to 32 peripherals are supported by the VPB bridge 100. Of course, the VPB bridge is expandable for use with any number of VPB peripherals by modifying the VPB address decoder 801.

The above described embodiment of the invention relieves the interrupting program stream from storing and restoring the contents of any VPB peripheral access that may have been underway before the interrupting program stream was directed to interrupt and begin execution. As a result, processing time, as well as code space is saved. Also, the compiler does not have to include instruction code for saving and restoring of SFR contents, thus the compiler design is simplified and less instructions are utilized in the compiled program streams.

The VPB bridge 100, shown in the example embodiments of the invention, is applicable for use with an 8051 processor core, known to those of skill in the art, where the 8051 microcontroller typically employs 4 interrupt priority levels. For example, the VBO bridge 100 is used within a 80051 MX1 core® microcontroller architecture manufactured by Philips semiconductors. Of course, the VPB bridge 100 is applicable to many other processor architectures.

Optionally, the register bank block decoder circuit 140 also includes a circuit 140a for storing and retrieving of register bank block selection data derived from the register bank block selection signal of a pre interrupt switch state, wherein upon terminating of an interrupt event the input switching circuit and the output switching circuit are provided with the pre interrupt register bank block selection signal derived from the stored bank block selection data.

Numerous other embodiments may be envisaged without departing from the spirit or scope of the invention.

We claim:

1. A system comprising:
a microcontroller including,
   a processor;
   a processor data bus connected to the processor;
   a set of peripherals;
   a peripheral data bus connected to the peripherals;
   a peripheral bus bridge providing an interface between the processor data bus and the peripheral data bus and including
      a plurality of special function register bank blocks that are internal to the microcontroller, each register bank block having a respective output and,
      a register bank block decoder circuit for decoding interrupts to provide a selection output for activation of one of the plurality of register bank blocks.

2. A system according to claim 1, further comprising:
a memory circuit for storing of a first program stream and for storing of a second program stream, wherein the processor utilizes a first register bank block from the plurality of register bank blocks during execution of the first program stream, and upon the occurrence of an interrupt resulting from an interrupt event associated with the second program stream, the processor executes the second program stream utilizing a second register bank block, the second register bank block different and logically isolated from the first register bank block.

3. A system according to claim 2, wherein the second program stream has a higher interrupt priority than the first program stream.

4. A system according to claim 1, wherein the peripheral bus bridge further includes:
an input switching circuit coupled to inputs of the plurality of register bank blocks and having a selection input port for selecting between data on the processor data bus and data on the peripheral data bus;
wherein the plurality of special function register bank blocks receive respective register bank block selection signals from the register bank block decoder circuit for activating one of the plurality of register bank blocks.

5. A system according to claim 4, wherein the input switching circuit is a multiplexer circuit.

6. A system according to claim 4, further comprising:
an output switching circuit coupled to outputs of the plurality of register bank blocks and having a selection input port for switchably coupling an activated one of the plurality of register bank blocks to the peripheral data bus.

7. A system according to claim 6, wherein the output switching circuit is a multiplexer circuit.

8. A system according to claim 6, further comprising a circuit for storing and retrieving of register bank block selection data derived from the register bank block selection signal, the register bank block selection data indicative of a pre-interrupt switch state, wherein upon terminating of an interrupt event, the input switching circuit and the output switching circuit are provided with a pre-interrupt register bank block selection signal derived from the stored register bank block selection data.

9. A system according to claim 8, wherein the state of the circuit for storing and retrieving of the register bank block selection data is based on interrupt priority.

10. A system according to claim 6, wherein the register bank block selection signal is based solely on interrupt priority.

11. A system according to claim 1, wherein a first register bank block from the plurality of register bank blocks is concurrently enabled along with a second different register bank block from the plurality of register bank blocks, the second different register bank block independently addressable from the first register bank block.

12. A system according to claim 1, further comprising a debug bank select register coupled to the register bank block decoder circuit, the debug bank select register for providing access to program stream data stored within the plurality of register bank blocks during a step of debugging.

13. A method of switching processing resources in a microcontroller comprising the steps of:
providing a plurality of special function register bank blocks that are internal to the microcontroller;
utilizing a first special function register bank block of the plurality of special function register bank blocks;
receiving of an interrupt request for initiating an interrupt event;
in response to the interrupt request selecting a second special function register bank block from the plurality of special function register bank blocks, and deselecting the first register bank block; and
utilizing the second special function register bank block from the plurality of register bank blocks.

14. A method according to claim 13, wherein a first program stream, corresponding to a first peripheral device of the microcontroller, is provided for utilizing the first register bank block and a second program stream, corresponding to a second peripheral device of the microcontroller, is provided for utilizing the second register bank block.

15. A method according to claim 14, wherein the first program stream has a lower interrupt priority than the second program stream, the interrupt priority used to determine whether to fulfill the interrupt request.

16. A method according to claim 14, wherein a processor executes the first and second program streams.

17. A method according to claim 16, further comprising the steps of:
halting execution of the second program stream;
selecting the first register bank block; and
resuming execution of the first program stream.

18. A method according to claim 17, wherein executing the instructions of the second program stream takes place without altering the contents of the first register bank block, which are in suspended use by the first program stream.

19. A method according to claim 14, further comprising the step of:
providing a memory circuit having a first memory region for storing of program stream data related to the first program stream.

20. A method according to claim 14, wherein the first and second program streams have stored therein instruction data for storing and restoring of register bank block contents.

21. A tangible storage medium having data stored thereon, the data for implementation of a processing system and comprising:

first instruction data for providing a plurality of special function register bank blocks of a peripheral data bridge for a microcontroller; and second instruction data for providing a register bank block decoder circuit for activating one of the plurality of register bank blocks in isolation, the register bank block decoder circuit responsive to interrupt event operations for selecting the one of the plurality of special function register bank blocks for being activated, wherein different interrupt event operations result in selection of different ones of the plurality of register bank blocks.

22. The system according to claim 1, wherein the peripheral bus bridge is configured and arranged to receive input data from the peripherals via the peripheral data bus and transmit output data to the peripherals via a second peripheral data bus.

23. The system according to claim 1, wherein the peripheral bus bridge is a very large scale integration (VLSI) peripheral bus bridge.

24. The system according to claim 1, wherein the processor is configured and arranged to, in response to the activation of the one of the plurality of register bank blocks, execute a program stream corresponding to the one of the plurality of register bank blocks using the one of the plurality of register bank blocks.

* * * * *